United States Patent [19]

Iwamoto

[11] Patent Number: 5,576,761
[45] Date of Patent: Nov. 19, 1996

[54] SOLID-STATE SENSOR HAVING DIRECT CURRENT CONTROL CIRCUITRY AND LOGARITHMIC OUTPUT SIGNAL

[75] Inventor: Tsuyoshi Iwamoto, Amagasaki, Japan

[73] Assignee: Minolta Camera Kabushiki Kaisha, Osaka, Japan

[21] Appl. No.: 552,435

[22] Filed: Nov. 3, 1995

Related U.S. Application Data

[63] Continuation of Ser. No. 200,660, Feb. 23, 1994, abandoned.

[30] Foreign Application Priority Data

Feb. 25, 1993 [JP] Japan ................................ 5-036400
Jan. 31, 1994 [JP] Japan ................................ 6-009132

[51] Int. Cl.$^6$ ............................................. H04N 5/16
[52] U.S. Cl. ........................ 348/257; 348/250; 257/236; 257/448
[58] Field of Search ............................ 348/250, 691, 348/243, 257; 250/252.1, 332; 257/236, 292, 448, 226, 234, 901; 377/60, 62; H04N 5/16

[56] References Cited

U.S. PATENT DOCUMENTS

| | | | |
|---|---|---|---|
| 4,498,105 | 2/1985 | Crawshaw | 348/243 |
| 4,602,291 | 7/1986 | Temes | 358/221 |
| 4,685,117 | 8/1987 | Arques | 377/60 |
| 4,712,010 | 12/1987 | Alm | 250/332 |
| 4,742,238 | 5/1988 | Sato | 250/208.1 |
| 4,742,380 | 5/1988 | Chang et al. | 257/125 |
| 4,745,446 | 5/1988 | Chang et al. | 257/272 |
| 4,763,200 | 8/1988 | Nakatani et al. | 358/282 |
| 4,857,725 | 8/1989 | Goodrough et al. | 250/214 A |
| 4,961,117 | 10/1990 | Rumley | 358/461 |
| 4,973,833 | 11/1990 | Takada et al. | 250/208.1 |
| 5,047,861 | 9/1991 | Houchin et al. | 348/247 |
| 5,105,276 | 4/1992 | Schrock | 348/250 |
| 5,241,575 | 8/1993 | Miyatake et al. | 257/236 |
| 5,289,286 | 2/1994 | Nakamura et al. | 257/292 |
| 5,324,958 | 6/1994 | Mead et al. | 257/292 |

OTHER PUBLICATIONS

James White, A Multiple Gate CCD–Photodiode Sensor Element for Imaging Arrays, Feb. 1978, pp. 125–131.

*Primary Examiner*—Michael Horabik
*Assistant Examiner*—Michael Day
*Attorney, Agent, or Firm*—Price, Gess & Ubell

[57] ABSTRACT

A solid-state image sensing apparatus comprises a charge coupled device, a plurality of photosensors, and a voltage generator. Each of the photosensors receives incident light, generates a voltage logarithmically proportional to an intensity of the incident light, and is connected to a first electrode of the charge coupled device. The voltage generator generates a reference voltage logarithmically proportional to an average intensity of the incident light on the photosensors and is connected to a second electrode of the charge coupled device. Signal charges are injected into the charge coupled device, depending on the voltage impressed on the first and second electrodes, so that a direct current component of an output of the charge coupled device is controlled.

19 Claims, 9 Drawing Sheets

SOLID-STATE SENSOR HAVING DIRECT CURRENT CONTROL CIRCUITRY AND LOGARITHMIC OUTPUT SIGNAL

This is a continuation of application Ser. No. 08/200,660, filed on Feb. 23, 1994, now abandoned.

BACKGROUND OF THE INVENTION

1. Field of the Invention

The present invention relates to a solid-state image sensing apparatus for obtaining an electrical signal which is in accordance with a quantity of incident light and, more particularly, to a solid-state image sensing apparatus capable of controlling a direct current component of an output signal.

2. Description of Related Art

U.S. Pat. No. 5,241,575 has proposed a solid-state image sensing apparatus which logarithmically converts and outputs a photoelectric current generated according to the quantity of incident light. In the solid-state image sensing apparatus, a voltage is applied as a reference voltage for charge integration. However, since the reference voltage is constant, the direct current component of the output voltage from the solid-state image sensing apparatus varies depending on the quantity of incident light.

U.S. Pat. No. 4,763,200 has proposed an apparatus which determines, in order to obtain a stable image, a reference voltage for an A/D converter based on an output resulting from the previously-performed detection of the light quantity of an exposure source and on an output of an image sensing device when an irradiation of a standard pattern by the exposure source is sensed by the image sensing device.

In a solid-state image sensing apparatus, it is necessary to convert the output signal from analog to digital format. In A/D conversion, it is preferable to convert an output signal of a wider range in larger gradations. However, in the solid-state image sensing apparatus of the prior art, since the direct current component of the output signal varies depending on the light quantity, and the luminance signal of the subject is added with the direct current component as the reference, considering the output when the subject is bright and the output when the subject is dark, the range of the output signal is large as shown in FIG. 1, even if the luminance difference in the subject is small. FIG. 1(a) indicates the output when the entire subject is bright and, in this case, the direct current component is large. FIG. 1(b) indicates the output when the entire subject is dark and, in this case, the direct current component is small. The range indicated by Y is the luminance difference in the subject, and the range indicated by AD is a range to be converted by the A/D converter. In order to obtain large gradations from an output having such a large range, an A/D converter of a larger bit number is required. The more bit numbers an A/D converter has, the more expensive it is. The direct current component corresponds to the average value of waveforms within the range indicated by Y.

In the apparatus of the prior art, in order to determine the reference voltage for the A/D converter, a number of elements, and complicated processing are required. That is, a shading circuit, a line random access memory (RAM), a central processing unit (CPU), etc. are needed in addition to the image sensing device and the light quantity sensor. To add the output of the light quantity sensor and the output of the image sensing device, the phases of the outputs are synchronized before they are inputted to an adding circuit. Moreover, it is necessary to adjust the line RAM until its content takes a predetermined value.

OBJECTS AND SUMMARY OF THE INVENTION

An object of the present invention is to provide a solid-state image sensing apparatus capable of controlling a direct current component of an output signal from the solid-state image sensing apparatus by means of a simple processing.

The above-mentioned object is achieved according to the present invention by inputting a predetermined voltage to a charge transferring device, such as a charge coupled device (CCD), for transferring a signal charge which is in accordance with a quantity of incident light, a voltage is controlled which serves as a reference voltage when the transferred charge is integrated, thereby controlling a direct current component of the quantity of incident light. The predetermined voltage inputted to the charge transferring device may be obtained in accordance with an average intensity of light incident on a photoelectric current generating device or may be an appropriately set value.

BRIEF DESCRIPTION OF THE DRAWINGS

This and other objects and features of this invention will become clear from the following description, taken in conjunction with the preferred embodiments with reference to the accompanied drawings in which.

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically.

Figure 2:
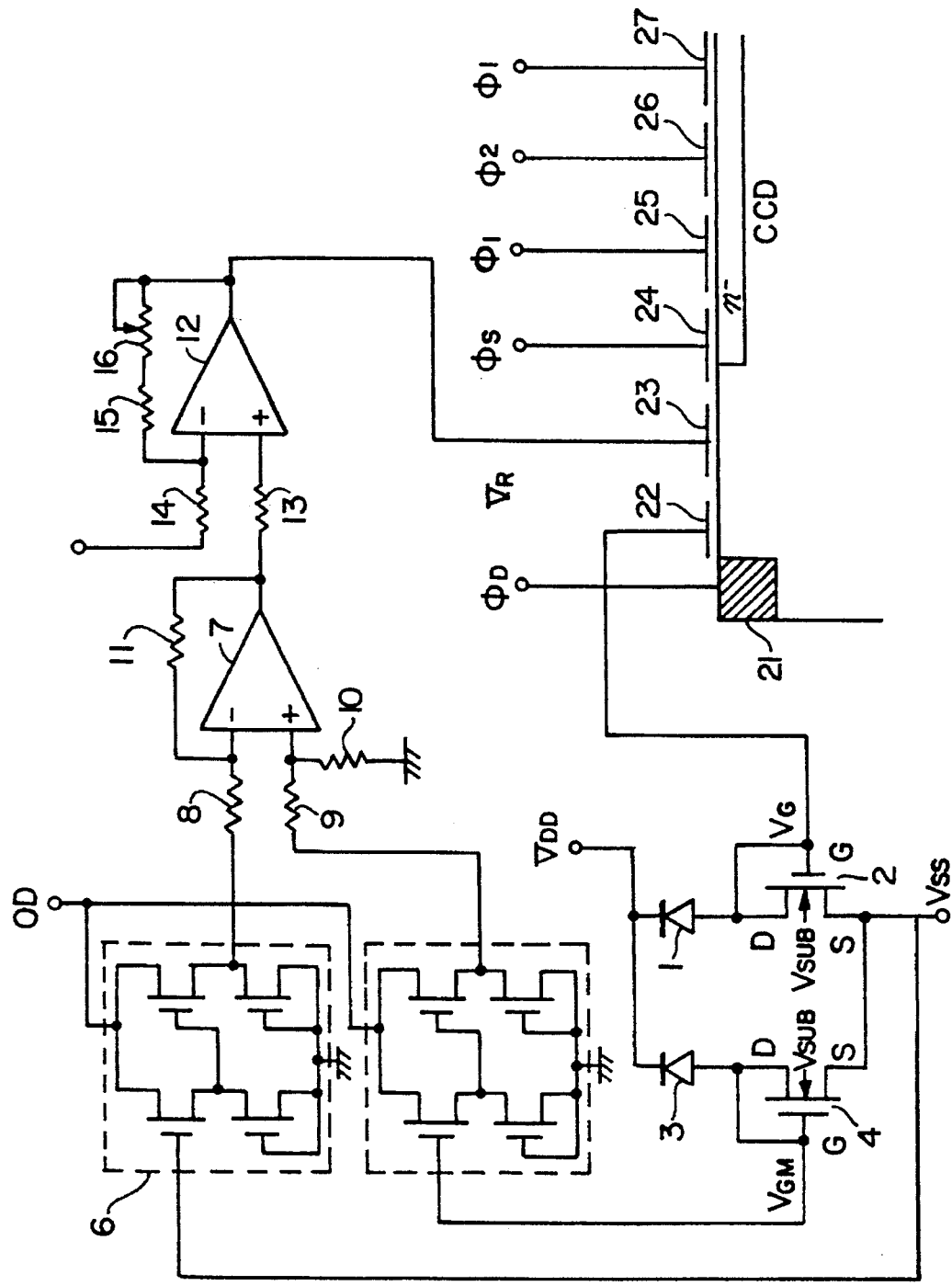
FIG. 2 is a circuit diagram of a first embodiment of the present invention.

Referring to FIG. 2, an example of an arrangement of a solid-state imaging sensing apparatus according to the present invention is shown. A pn-junction photodiode 1 receives incident light, and a voltage $V_{DD}$ is applied to the cathode of the photodiode 1. The anode thereof is connected to a drain D and a gate G of an n-channel metal oxide semiconductor field effect transistor (MOSFET) 2. A voltage $V_{SS}$ is applied to a source S of the MOSFET 2, and a voltage $V_{SUB}$ is applied to a back gate (substrate) thereof. The relationship between biases thereof is $V_{DD} > V_{SS} \geq V_{SUB}$. A reverse bias is applied to the photodiode 1. Reverse bias is also applied between the source S and the substrate of the MOSFET 2 and between the drawing D and the substrate of the MOSFET 2. The voltage $V_{SUB}$ applied to the back gate (in this case, substrate) is adjusted so that a subthreshold current flows through the MOSFET 2.

When light is incident on the photodiode 1, a photoelectric current proportional to the quantity of that light flows from the cathode to the anode. Since the voltage $V_{SUB}$ is adjusted so that a subthreshold current flows as described above, the drain current of the MOSFET 2 becomes an exponential function of the voltage between the gate G and source S. That is, the photoelectric current is logarithmically converted and applied to a first electrode 22 of a charge coupled device (CCD) as a voltage $V_G$.

The gate voltage $V_G$ of the MOSFET 2 for logarithmic conversion, and a reference voltage $V_R$, are applied to the first electrode 22 and to a second electrode 23 of the CCD, respectively, and a signal charge is injected according to a difference between channel potentials under these two electrodes. A pulse $\phi D$, a pulse $\phi S$, a pulse $\phi 1$, and a pulse $\phi 2$ are applied to a CCD input diode 21, a third electrode 24, a fourth electrode 25, and a fifth electrode 26, respectively, according to timing shown in FIG. 3. Charge is transferred to a sixth electrode 27 and to subsequent electrodes by two-phase driving in which the pulses $\phi 1$ and $\phi 2$ are applied in turn. The above-described photodiode 1, MOSFET 2, and transferring portion CCD are provided in every pixel.

Figure 3:
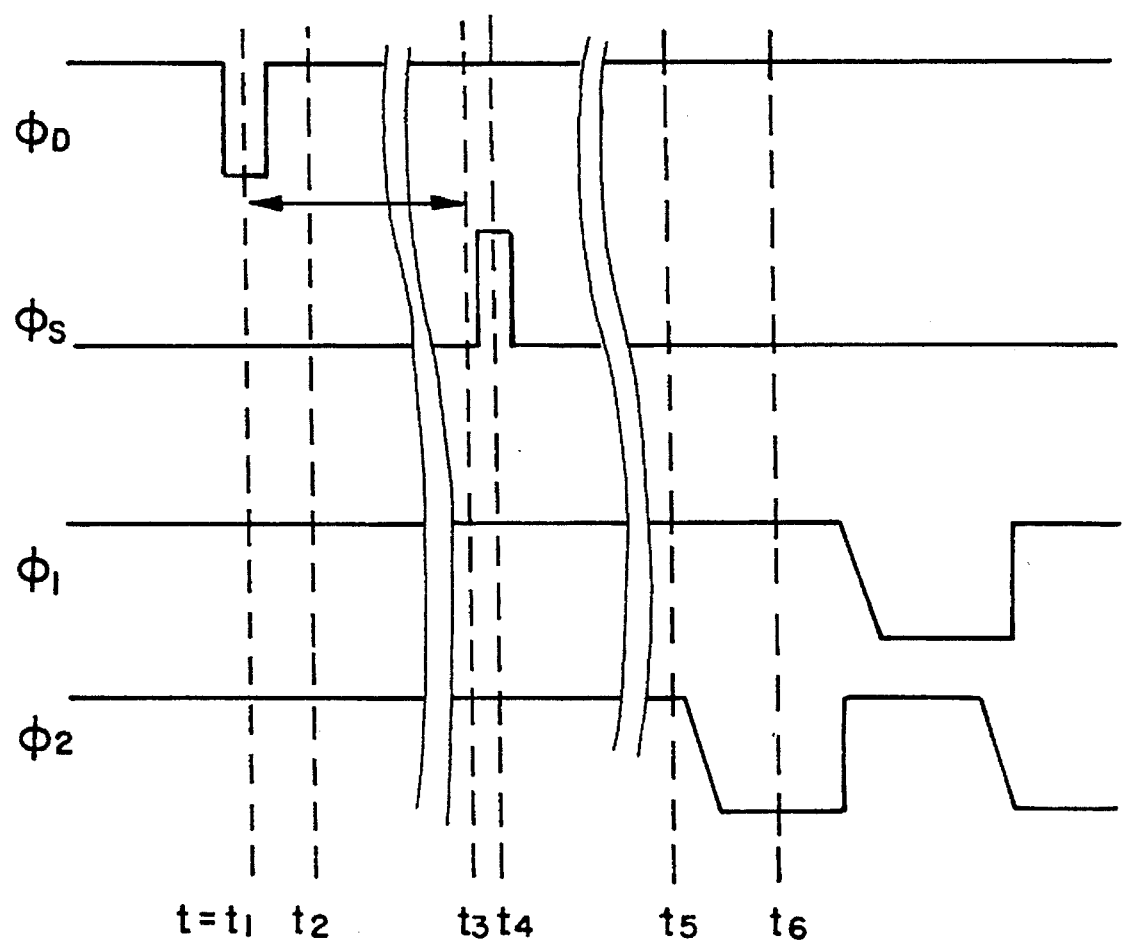
FIG. 3 is a timing chart of a clock signal applied to drive a CCD.
Figure 4:
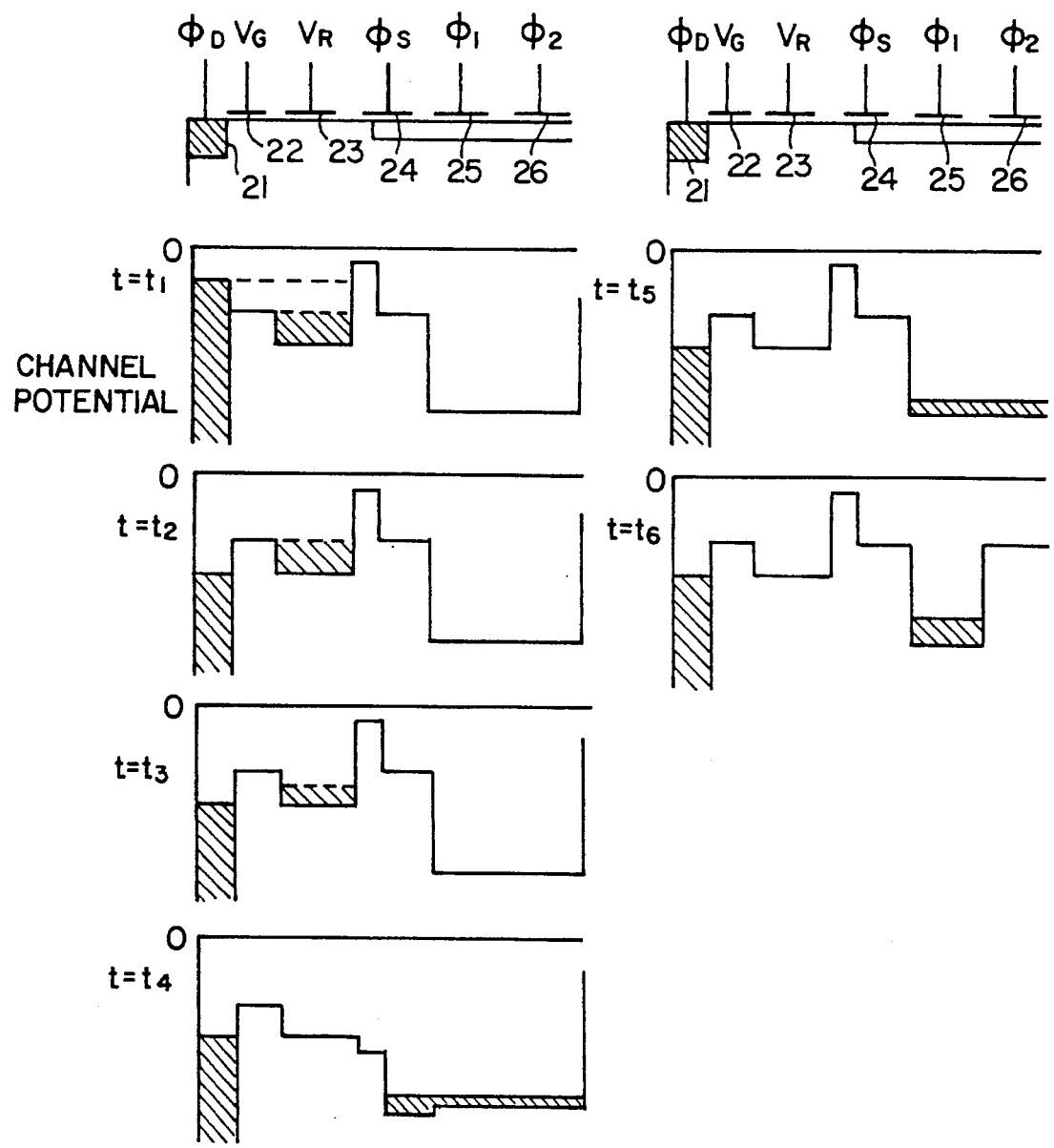
FIG. 4 is a conceptional view of the operation principle of the CCD.

A charge transferring operation is now described with reference to FIGS. 3 and 4. FIG. 3 is a timing chart for a clock signal for integrating or transferring charge. FIG. 4 shows channel potentials corresponding to the timing chart of the driving pulse.

First, when the level of the clock $\phi D$ applied to the CCD input diode 21 is changed from high to low at t=t1, charge is provided from under the first electrode 22 to under the second electrode 23. The channel potential views of FIG. 4 show that charge is present in the hatched portions. When the level of the clock $\phi D$ is changed to high at t=t2, the excessive charge is returned to the input diode 21. The operation up to this point corresponds to the reset operation. Thereby, a charge according to the difference between the reference voltage $V_R$ and the gate voltage $V_G$ is integrated under the second electrode 23, and an integration operation is started after this. In the integration operation, a part of the charge under the second electrode 23 is discharged from under the first electrode 22 to the input diode 21.

After the integration time (period of time indicated by the arrow in the timing chart of FIG. 3) is over at t=t3, when the level of the pulse $\phi S$ is changed to high at t=t4, the integrated charge flows into a shift register having states 24, 25, 26, 27, etc. since the channel potential in the third electrode 24 decreases. Since the offset of the amount of charge transferred to the shift register depends on the reference voltage $V_R$ being applied to the second electrode 23, the offset of the output signal may be manipulated by adjusting the voltage $V_R$.

Then, when the level of a signal provided to a $\phi 2$ electrode (electrode driven by the pulse $\phi 2$) is changed from high to low at t=t5, the channel potential of the $\phi 2$ electrode increases, so that the charge gathers to a $\phi 1$ electrode (electrode driven by the pulse $\phi 1$) (t=t6). Thereafter, the charge is transferred to the $\phi 2$ electrode by the change in level of the pulse $\phi 1$ from high to low and in level of the pulse $\phi 2$ from low to high. By inputting a clock of a reverse phase to the $\phi 1$ and $\phi 2$ electrodes under this condition, the charge is transferred to the next register.

The reference voltage $V_R$ will now be described. A monitor photodiode 3 provided for monitoring the intensity of light incident on the light-receiving portion has a similar arrangement as that of the previously-described photodiode 1, and a similar bias is applied thereto. A MOSFET 4 to which a similar bias to that of the MOSFET 2 is applied logarithmically converts into a gate voltage $V_{GM}$ a photoelectric current which is in accordance with the quantity of light incident on the monitor photodiode 3. The voltage $V_{GM}$ is inputted to a source follower amplifier 5. The voltage $V_{SS}$ serving as the source voltage for the MOSFETs 2 and 4 is coupled to the input terminal of a source follower amplifier 6.

The source follower amplifiers 5 and 6 have the same arrangements, which generally comprise a combination of four MOSFETs. The outputs are coupled through a resistor 8 to an inverting input terminal of a differential amplifier 7, and through a resistor 9 to a noninverting input terminal thereof. The noninverting input terminal is connected through a resistor 10 to ground, and the output terminal and the inverting input terminal of the differential amplifier 7 are connected through a resistor 11. The differential amplifier 7 outputs a voltage which is a difference between an output signal of the monitor photodiode 3 and the supply voltage $V_{SS}$. In doing so, it removes a variation amount of the supply voltage $V_{SS}$ so that a highly reliable output with no errors due to voltage variation is produced.

The output of the differential amplifier 7 is inputted through a resistor 13 to a noninverting input terminal of a differential amplifier 12. A direct current level adjusting voltage $V_L$ is coupled to a noninverting input terminal of the differential amplifier 12 through a resistor 14. An output terminal and the inverting input terminal of the differential amplifier 12 are connected through a resistor 15 and a variable resistor 16. By adjusting the degree of amplification by the differential amplifier 12 and the direct current level adjusting voltage $V_L$ to appropriate values, a desired reference voltage $V_R$ which is in accordance with the quantity of light incident on the monitor photodiode 3 may be obtained. The obtained voltage $V_R$ is inputted to the second electrode 23 of the CCD.

With the circuit arrangement as described above, the reference voltage $V_R$ may be adjusted according to the average intensity of incident light. As a result, the direct current component of the output voltage from the transferring portion CCD is always maintained constant.

Figure 1:
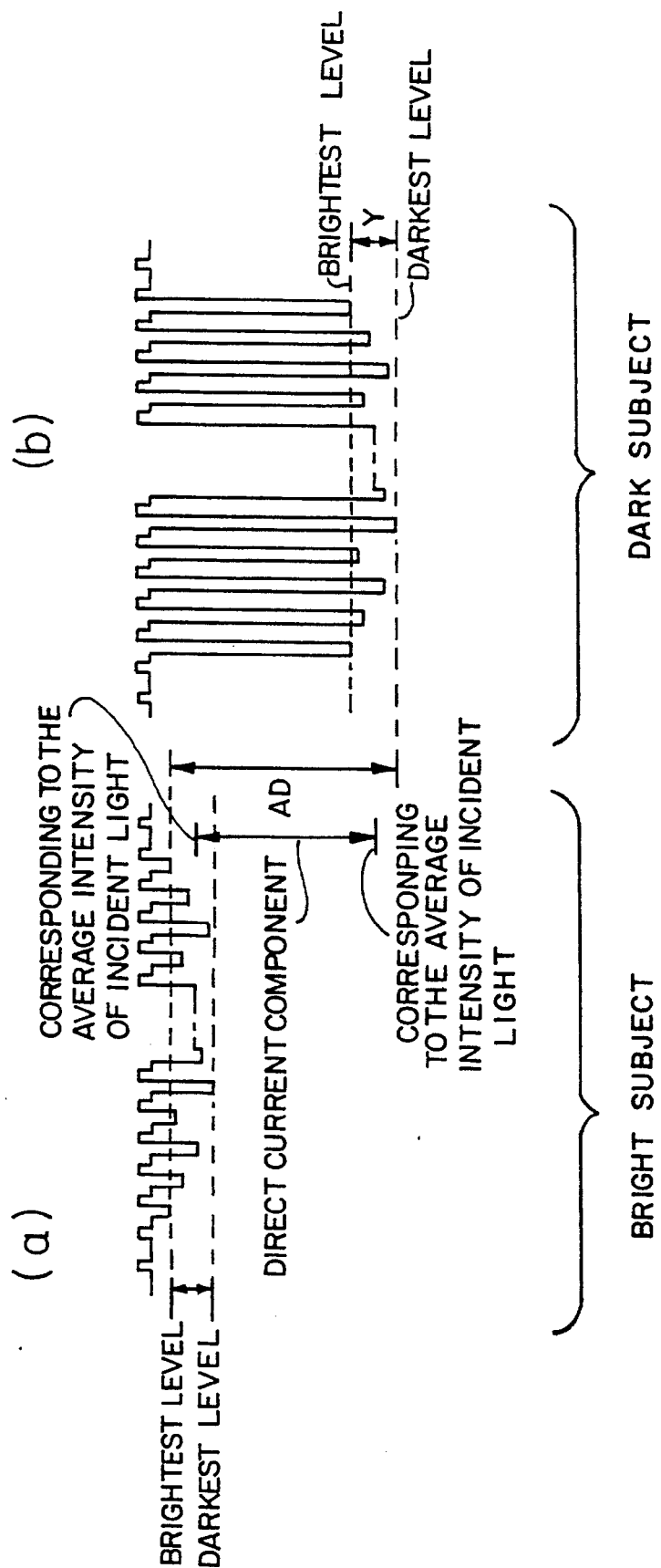
FIG. 1 shows an output signal of a conventional prior art solid-state image sensing apparatus in which the reference voltage is not manipulated.

The output signal of the solid-state image sensing apparatus will now be described. As previously described, the output signal of a conventional solid-state image sensing apparatus to which a reference voltage $V_R$ that is not manipulated but constant is of a wide range from the condition shown at (a) of FIG. 1 when the subject is bright to the condition shown at (b) of FIG. 1 when the subject is dark, even if the luminance difference in the subject is small. To convert these outputs into digital format, it is necessary to convert a voltage of a wide range. However, this makes it impossible to obtain sufficient gradation. To obtain sufficient gradation, an analog-to-digital (A/D) converter having a large bit number is required.

Figure 5:
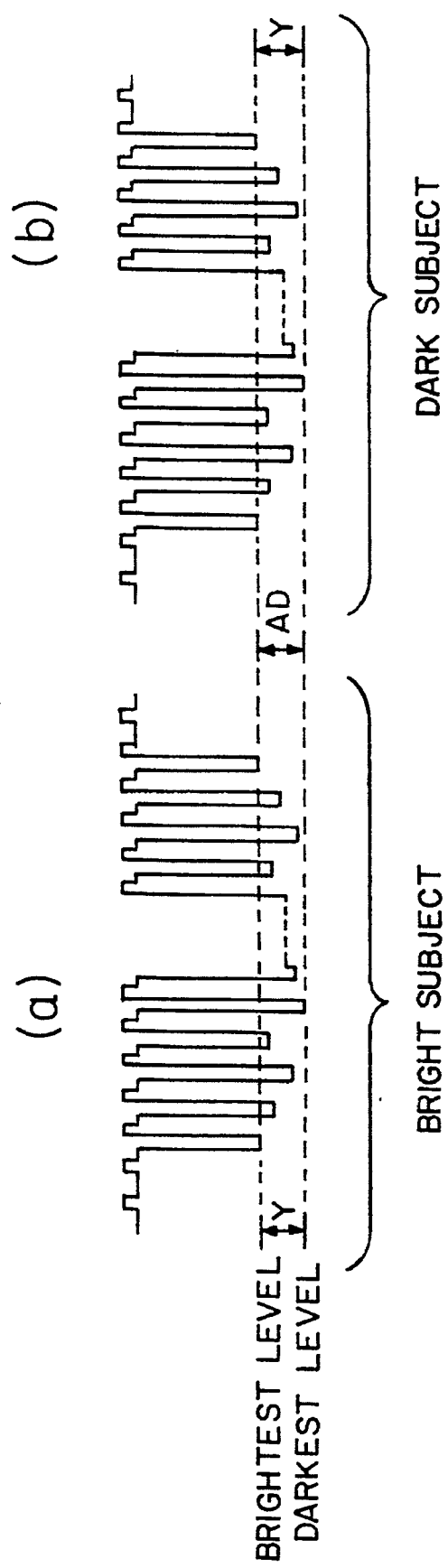
FIG. 5 shows an output signal of a solid-state image sensing apparatus of the present invention.

On the contrary, in the solid-state image sensing apparatus of the present invention, as shown in FIG. 5, since the direct current component of the output signal is constant both when the subject is bright and when the subject is dark, the range AD to be A/D converted is only the range Y indicating the amplitude variation of the luminance signal of the subject. As a result, sufficient gradation is obtained by means of an A/D converter of a smaller bit number. Moreover, if an A/D converter of a conventional bit number is used, more gradations will be obtained.

Figure 6:
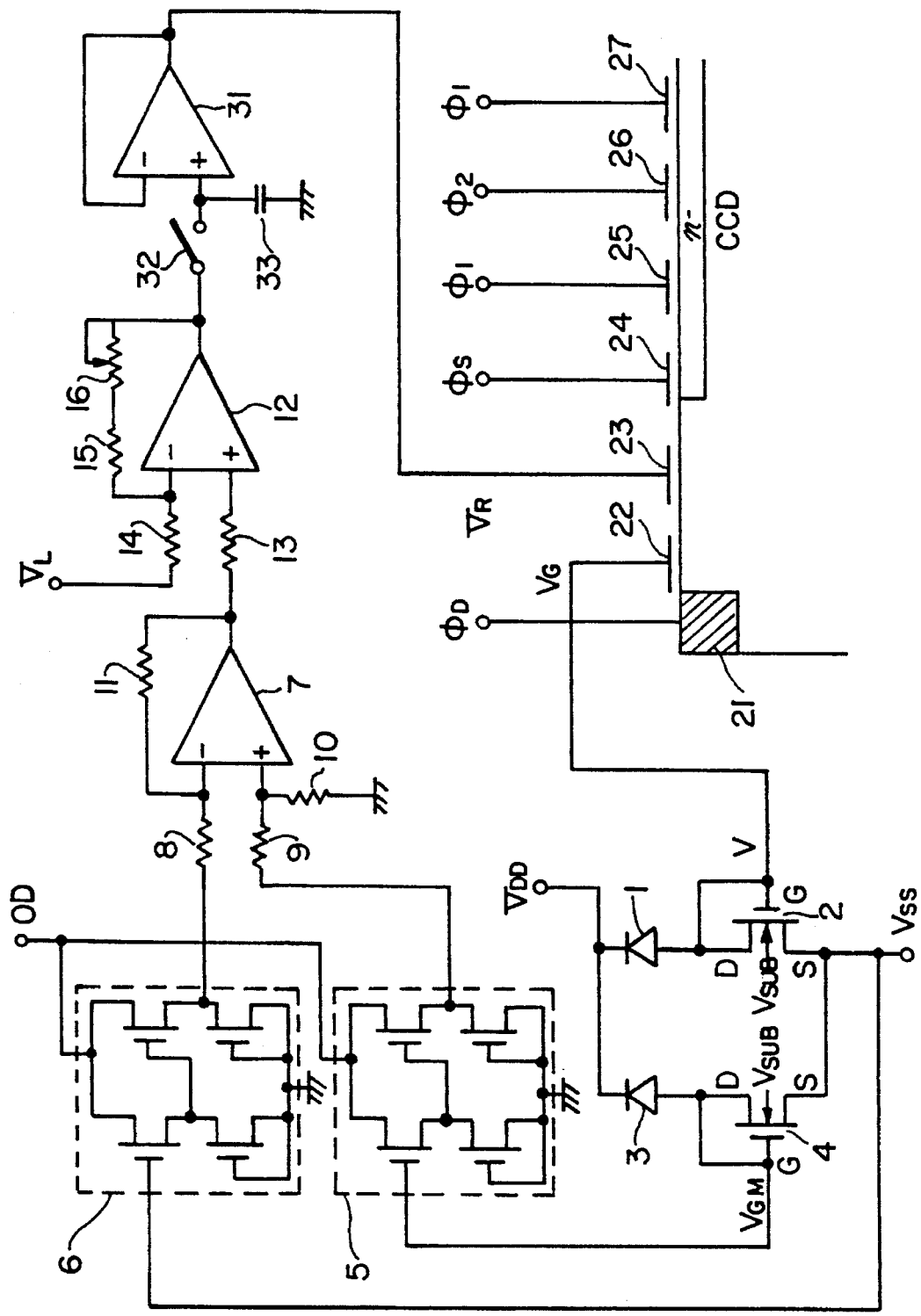
FIG. 6 is a circuit diagram of a second embodiment of the present invention.

Referring to FIG. 6, a second embodiment of the present invention will be described in which a sample and hold circuit is added to the output of the differential amplifier 12 of the first embodiment of FIG. 2. The same arrangement as that of FIG. 2 will not be described; only the arrangement of the added portion will be described. The output of the amplifier 12 is coupled through a switch 32 to a noninverting input terminal of a buffer amplifier 31. The noninverting input terminal is connected through a capacitor 33 to ground. An output terminal and an inverting input terminal of the buffer amplifier 31 are shorted. The output is coupled to the second electrode 23 of the CCD as the reference voltage $V_R$. If the switch 32 is turned off and the reference voltage $V_R$ is held for a predetermined period of time, for example, during the integration time and readout time (t=t1 to t5), it is possible to remove the influence caused by the fact that the light quantity has changed during the hold time. The supply voltages for the amplifiers 7, 12, and 31 of FIGS. 2 and 6 are not shown.

Figure 7A:
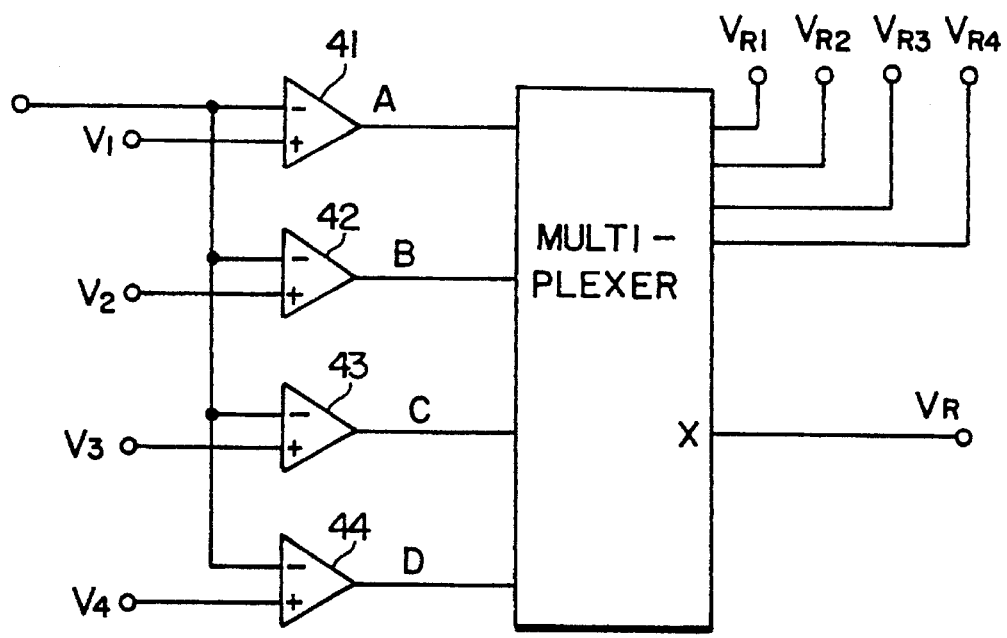
FIGS. 7A and 7B show other embodiments of the voltage converting means.
Figure 7B:
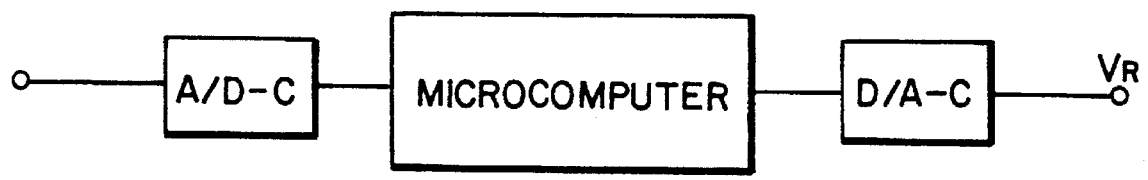

The present invention is not limited to the circuit arrangements of the above-described two embodiments, and various modifications are possible. While amplifying circuits 12 and 31 of FIGS. 2 and 6 are used as voltage converting means in the above embodiments, arrangements as shown in FIGS. 7A and 7B may be used. FIG. 7A shows a circuit using four comparators. The four comparators 41, 42, 43, and 44 compare the output voltage of the amplifier 7 of FIGS. 2 and 6 and reference voltages $V_1$, $V_2$, $V_3$, and $V_4$ to thereby output control signals A, B, C, and D to a multiplexer. Based on these signals, a determination is made as to which of voltages $V_{R1}$, $V_{R2}$, $V_{R3}$, and $V_{R4}$ is outputted from a terminal X. The output voltage is used as the reference voltage $V_R$.

A circuit where an FET or a D/A converter is used instead of a multiplexer may also be possible. FIG. 7B is a block diagram of a circuit where a microcomputer is used as the voltage converting means. The output of the amplifier 7 is converted into digital format by an A/D converter. The digital data is calculation-processed by the microcomputer to obtain digital data of the reference voltage $V_R$. The digital data is converted into analog format by a D/A converter. The output thereof is used as the reference voltage $V_R$. The circuit using such voltage converting means may be formed on the same chip as that on which the photoelectric current generating portion and the transferring portion are formed.

Figure 8:
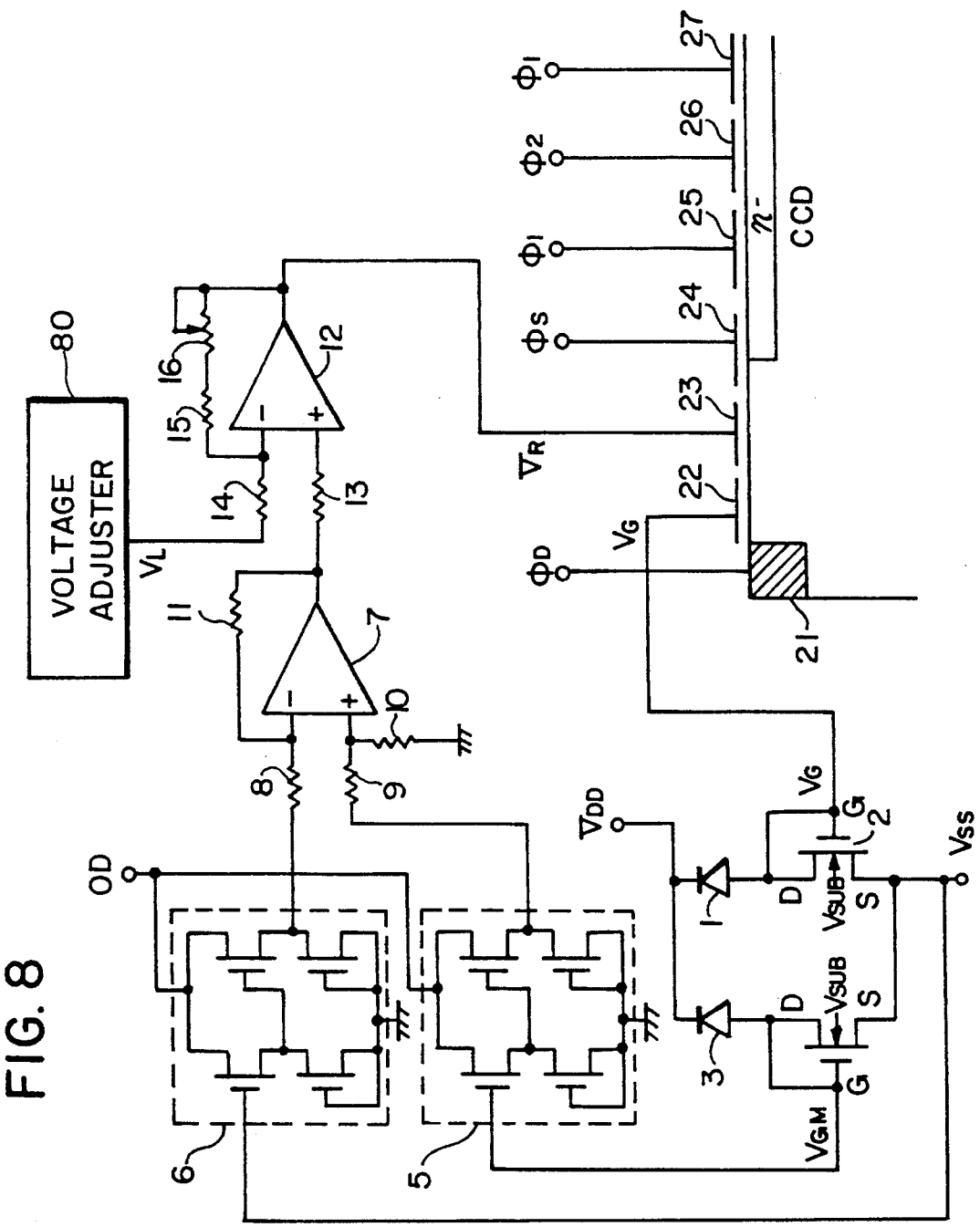
FIG. 8 is a circuit diagram of a third embodiment of the present invention.

Referring now to FIG. 8, there is shown a third embodiment of the present invention, wherein a voltage adjuster 80 is provided so that the reference voltage $V_R$ may arbitrarily be adjusted. That is, while in the above-described first and second embodiments, only the reference voltage $V_R$, in accordance with an output signal of the monitor photodiode 3, is obtained by use of the output signal. In the embodiment of FIG. 8, the reference voltage $V_R$ can be adjusted externally by a user, for example, as explained below.

Figure 9:
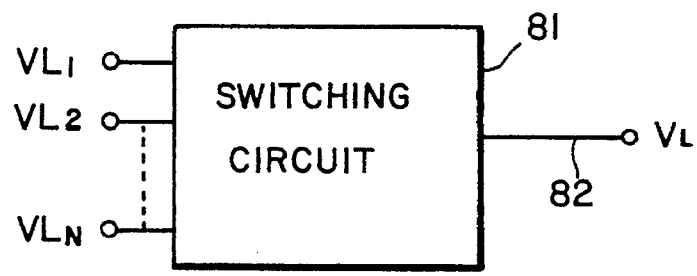
FIG. 9 shows an example of an arrangement of a voltage adjuster used in the third embodiment of the present invention.

The arrangement of FIG. 8 is the same as that of FIG. 2 except that the voltage adjuster 80 is connected through the resistor 14 to the inverting terminal of the amplifier 12 and, therefore, no description will be given of the same elements. The voltage adjuster 80 outputs an adjusting voltage $V_L$. Its arrangement may be, for example, as shown in FIG. 9 where one of the plurality of prepared voltages $V_{L1}$, $V_{L2}$ . . . , $V_{LN}$ is directed to an output terminal 82 by a switching circuit 81, and the directed voltage is used as the adjusting voltage $V_L$. The arrangement of the voltage adjuster 80 may alternatively be as shown in FIG. 10 where a command is transmitted to a microcomputer 90, the microcomputer 90 outputs a digital output corresponding to the command, the output is converted into an analog signal by a digital-to-analog (D/A) converter 91, and the analog signal is used as the adjusting voltage $V_L$.

Figure 10:
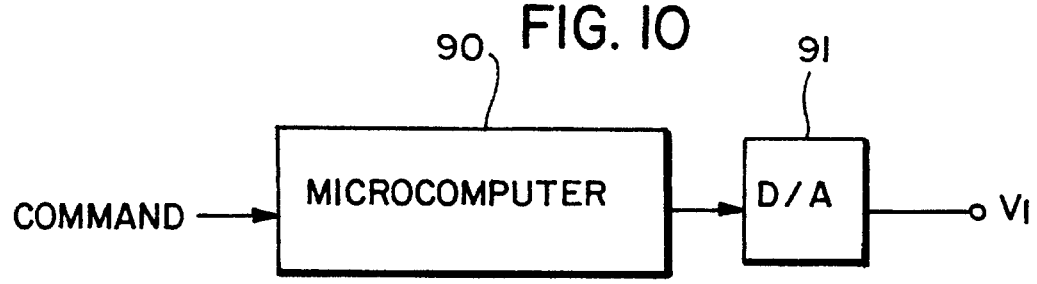
FIG. 10 shows another example of an arrangement of a voltage adjuster.

A selection signal for the switching circuit 81 of FIG. 9 and the command of FIG. 10 are generated, for example, based on an operation of an operation key. Needless to say, in FIG. 9, the switching circuit 81 may be a mechanical switch which can be manually operated. In the embodiment of FIG. 8, since the reference voltage $V_R$ which is an output of the amplifier 12 can be controlled to a desired value, not only is the direct current component of the CCD output voltage maintained constant, but also the level can be shifted by a desired amount from the constant level. This means that the user can adjust the brightness of the image as desired. For example, if the arrangement is employed in the solid-state image sensing apparatus for a video camera, the brightness control equivalent to the aperture control can be manually adjusted in addition to the automatic adjustment. If the arrangement is employed in an image reader for a copying machine, the image density can be manually adjusted in addition to the automatic adjustment.

Figure 11:
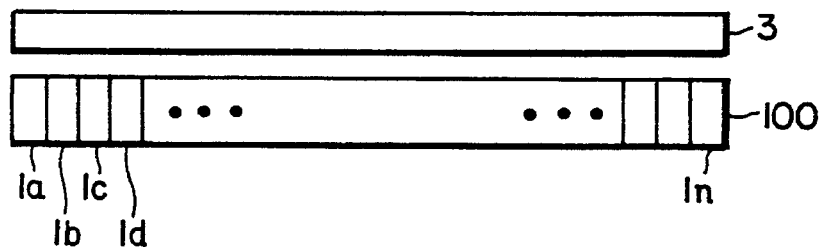
FIG. 11 shows an example of the photodiodes and a monitor photodiode used in the embodiments of the present invention.
Figure 12:
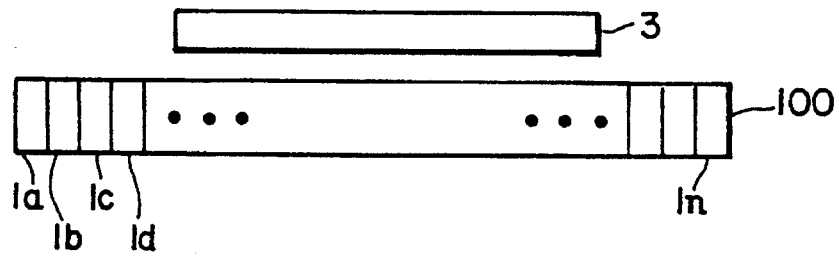
FIG. 12 shows another example of the photodiodes and the monitor photodiode used in the embodiments of the present invention.

FIGS. 11 and 12 show the monitor photodiode 3 and the photodiode 1 used in the above-described embodiments. Each of the plurality of photodiodes 1a to 1n constituting a light-receiving device 100 which corresponds to the photodiode 1. In one embodiment, the monitor photodiode 3 has a length corresponding to the length of the light-receiving device 100, as shown in FIG. 11. The monitor photodiode 3 outputs a monitored amount that is proportional to the sum of light incident on the photodiodes 1a to 1n. In the embodiment of FIG. 12, the monitor photodiode 3 outputs only a portion of the amount outputted by the monitor photodiode 3 of FIG. 11. In the case of the embodiment of FIG. 12, the average light intensity of the photodiode 3 is regarded as the light intensity of the entire device.

Each of the photodiodes 1a, 1b, 1c, . . . , 1n corresponds to one pixel. The average of outputs of a preliminary measurement of the light-receiving device 100 with respect to all or a part of these pixels may be held so that it may be used as a reference voltage for the next measurement. In this case, more time is required than in the above-described embodiments, since it is necessary to perform readout from the light-receiving device 100 twice per measurement. However, this method is advantageous, since the monitor photodiode 3 is unnecessary.

Only the output voltage of the voltage adjuster 80 may be applied to the second electrode 23 without applying the output of the monitor photodiode 3 and the measurement output of the light receiving device 100 to the second electrode 23. In this case, although the direct current level when the subject is bright, and the direct current level when the subject is dark, are not the same, the brightness of the image can freely be adjusted by applying an output voltage of the voltage adjuster 80 to the second electrode 23. For example, if the arrangement is employed in the solid-state image sensing apparatus for a video camera, the brightness control equivalent to the aperture control can be manually adjusted. If the arrangement is employed in an image reader for a copying machine, the image density can be manually adjusted.

As described above, according to the present invention, by simple processing, the direct current component of the output signal of the solid-state image sensing apparatus is controlled.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A solid-state image sensing apparatus, comprising:
   a charge coupled device having a plurality of electrodes;
   a plurality of photosensors, each of which receives incident light and generates a photogenerated current;
   a plurality of first voltage generators, each of which is connected to a respective one of said plurality of photosensors for receiving the photogenerated current, and connected to a respective first electrode of said charge coupled device, each one of said first voltage generators generating a voltage logarithmically proportional to the received photogenerated current, and applying the generated voltage to the respective first electrode of the charge coupled device; and
   a second voltage generator connected to a second electrode of said charge coupled device, said second voltage generator generating a reference voltage logarithmically proportional to an average intensity of the light incident on the plurality of photosensors during image sensing, and applying the generated voltage to a second electrode of said charge coupled device;
   whereby signal charges are injected into said charge coupled device depending on the voltage impressed on the first and second electrodes, and thereby controlling a direct current component of an output of the charge coupled device.

2. The solid-state image sensing apparatus of claim 1, wherein said second voltage generator comprises a monitor photosensor which receives incident light and generates a reference voltage logarithmically proportional to an average intensity of the incident light.

3. The solid-state image sensing apparatus of claim 2, wherein said monitor photosensor is located next to the plurality of photosensors in order to measure the light incident on said plurality of photosensors.

4. The solid-state image sensing apparatus of claim 3, wherein the plurality of photosensors are arranged in a row and the monitor photosensor, having a length shorter than the row of photosensors, is located parallel to the row of photosensors.

5. The solid-state image sensing apparatus of claim 3, wherein the plurality of photosensors are arranged in a row and the monitor photosensor, having a length equal to the row of photosensors, is located parallel to the row of photosensors.

6. The solid-state image sensing apparatus of claim 3, further comprising a sample and hold circuit, between the monitor photosensor and the second electrode of the charge coupled device, said sample and hold circuit holding an output from the monitor photosensor for a predetermined period.

7. The solid-state image sensing apparatus of claim 1, wherein signal charges are injected into the charge coupled device depending on the voltage difference impressed on the first and second electrodes, thereby controlling a direct current component of an output of the charge coupled device.

8. The solid-state image sensing apparatus of claim 1, wherein each photosensor of said plurality of photosensors comprises a photodiode and wherein each of said plurality of first voltage generators comprises a metal oxide semiconductor field effect transistor.

9. The solid-state image sensing apparatus of claim 8, wherein the metal oxide semiconductor field effect transistor has a drain and a gate, both of which are connected to a respective photodiode, said transistor being operated in a subthreshold region in order to output a voltage logarithmically proportional to the photoelectric current generated by the photodiode.

10. The solid-state image sensing apparatus of claim 1, further comprising a voltage adjuster connected to said second voltage generator for adjusting the reference voltage output from said second voltage generator.

11. A solid-state image sensing apparatus comprising:
    a charge coupled device having a plurality of electrodes;
    means for receiving incident light and generating a photogenerated current;
    first means, connected to said receiving means and to a first electrode of said charge coupled device, for receiving the photogenerated current, generating a voltage logarithmically proportional to the photogenerated current, and applying the generated voltage to said first electrode; and
    second means, connected to a second electrode of said charge coupled device, for generating a reference voltage proportional to an average intensity of the light incident on the incident light receiving means during image sensing, and applying the reference voltage to the second electrode;
    whereby signal charges are injected into said charge coupled device depending on the voltage impressed on the first and second electrodes, and thereby controlling a direct current component of an output of the charge coupled device.

12. A direct current component controlling method for a solid-state image sensing apparatus having a charge coupled device and a plurality of photosensors, each of which receives incident light and produces a photogenerated current, a plurality of voltage generators, each of which is connected to a respective photosensor, and to a first electrode of said charge coupled device, for receiving the photogenerated current and generating a voltage logarithmically proportional to the received photogenerated current, said method comprising the following steps:
    generating a reference voltage logarithmically proportional to an average intensity of the incident light on said plurality of photosensors during image sensing; and
    supplying the reference voltage to the charge coupled device in order to inject signal charges into the charge coupled device depending on the voltage impressed on the electrodes of the charge coupled device, thereby controlling a direct current component of the output of the charge coupled device.

13. A solid-state image sensing apparatus, comprising:

a charge coupled device having a first electrode and a second electrode;

receiving means for receiving incident light;

first generating means for generating a first voltage that is logarithmically proportional to an intensity of the incident light received by the light receiving means, the first generating means outputting the first voltage to the first electrode of said charge coupled device; and second generating means for generating a second voltage that is logarithmically proportional to an average intensity of the incident light received by the receiving means during image sensing, the second generating means outputting the second voltage to the second electrode of said charge coupled device;

whereby signal charges are injected into said charge coupled device depending on the first and second voltages on the first and second electrodes, and thereby controlling a direct current component of an output of the charge coupled device.

14. A method for sensing a subject with a solid-state image sensing apparatus having a charge coupled device and a plurality of photosensors, each of which receives incident light and produces a photogenerated current, a plurality of voltage generators, each of which is connected to a respective photosensor and is also connected to a first electrode of the charge coupled device, for receiving the photogenerated current and generating a voltage proportional to the received photogenerated current, the method comprising the following steps:

performing a preliminary measurement of the sensed subject by the photosensors;

generating a reference voltage corresponding to an average intensity of the incident light on the photosensors at the time of the preliminary measurement; and performing a main measurement of the sensed subject while supplying the reference voltage to a second electrode of the charge coupled device.

15. The method of claim 14, wherein the voltage generated by each of the voltage generators is logarithmically proportional to the received photogenerated current, and the reference voltage is also logarithmically proportional to the average intensity of the incident light on the photosensors.

16. The method of claim 15, wherein signal charges are injected into the charge coupled device depending on the voltage impressed on the first and second electrodes, and thereby controlling a direct current component of an output of the charge coupled device.

17. A solid-state image sensing apparatus which senses a subject and generates an electrical signal thereof, comprising:

a charge coupled device having a plurality of electrodes;

a plurality of photosensors, each of which receives incident light and generates a photogenerated current;

a plurality of first voltage generators, each of which is connected to a respective one of said plurality of photosensors for receiving the photogenerated current, and connected to a respective first electrode of said charge coupled device, each one of said first voltage generators generating a voltage corresponding to the received photogenerated current, and applying the generated voltage to the respective first electrode of the charge coupled device; and a second voltage generator connected to a second electrode of said charge coupled device, said second voltage generator generating a reference voltage corresponding to an average intensity of the light incident on the plurality of photosensors from the sensed subject, and applying the generated voltage to a second electrode of said charge coupled device.

18. The solid-state image sensing apparatus of claim 17, wherein the voltage generated by each of the first voltage generators is logarithmically proportional to the received photogenerated current, and the reference voltage is also logarithmically proportional to the average intensity of the first incident light on the photosensors.

19. The solid-state image sensing apparatus of claim 18, wherein signal charges are injected into the charge coupled device depending on the voltage impressed on the first and second electrodes, and thereby controlling a direct current component of an output of the charge coupled device.

* * * * *